(12) United States Patent
Martin

(10) Patent No.: US 10,769,970 B2
(45) Date of Patent: *Sep. 8, 2020

(54) SIGN MANUFACTURING SYSTEM

(71) Applicant: Jack B. Martin, Oak Park, CA (US)

(72) Inventor: Jack B. Martin, Oak Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/401,682

(22) Filed: May 2, 2019

(65) Prior Publication Data

US 2019/0347964 A1 Nov. 14, 2019

Related U.S. Application Data

(63) Continuation of application No. 15/977,421, filed on May 11, 2018, now Pat. No. 10,283,018.

(51) Int. Cl.
| | |
|---|---|
| *B23K 26/00* | (2014.01) |
| *G09F 7/16* | (2006.01) |
| *G09B 21/02* | (2006.01) |
| *B41J 3/32* | (2006.01) |
| *B41M 1/30* | (2006.01) |
| *B44C 3/00* | (2006.01) |
| *B41M 7/00* | (2006.01) |
| *B23K 26/38* | (2014.01) |
| *B41F 33/16* | (2006.01) |
| *B23K 26/08* | (2014.01) |
| *B23K 26/12* | (2014.01) |
| *B23K 37/02* | (2006.01) |
| *B23K 103/16* | (2006.01) |
| *B23K 101/18* | (2006.01) |

(52) U.S. Cl.
CPC .......... *G09F 7/165* (2013.01); *B23K 26/0006* (2013.01); *B23K 26/0093* (2013.01); *B23K 26/0876* (2013.01); *B23K 26/127* (2013.01); *B23K 26/38* (2013.01); *B23K 37/0235* (2013.01); *B41F 33/16* (2013.01); *B41J 3/32* (2013.01); *B41M 1/305* (2013.01); *B41M 7/0081* (2013.01); *B44C 3/005* (2013.01); *G09B 21/02* (2013.01); *B23K 2101/18* (2018.08); *B23K 2103/172* (2018.08)

(58) Field of Classification Search
CPC ........... B23K 26/0006; B23K 26/0093; B23K 26/0876; B23K 26/127; B23K 26/38; B23K 37/0235; B41F 33/16; B41J 3/32; B41M 1/305; B41M 7/0081; G09F 7/165
See application file for complete search history.

(56) References Cited

U.S. PATENT DOCUMENTS

| | | |
|---|---|---|
| 4,116,097 A | 9/1978 | Graham et al. |
| 4,568,815 A | 2/1986 | Kimbara et al. |
| 4,579,754 A | 4/1986 | Maurer et al. |

(Continued)

*Primary Examiner* — Lamson D Nguyen
(74) *Attorney, Agent, or Firm* — Olav M. Underdal; IDP Patent Services

(57) ABSTRACT

A sign manufacturing system includes a printing base, a printing panel with a top layer, pressure sensitive adhesive and a transparent bottom layer, a bridge component, a sliding assembly, including an assembly body, a cutting laser, a liquid ejection unit, a curing laser, and a control unit, such that the cutting laser cuts out characters in the top layer without affecting the bottom layer, and such that the liquid ejection unit deposits spherical domes of printing fluid on exposed surface of the transparent bottom layer to form a braille text.

20 Claims, 11 Drawing Sheets

(56) References Cited

U.S. PATENT DOCUMENTS

| | | | |
|---|---|---|---|
| 5,336,458 | A | 8/1994 | Hutchison et al. |
| 5,512,122 | A | 4/1996 | Sokyrka |
| 5,627,578 | A | 5/1997 | Weintraub |
| 6,066,437 | A | 5/2000 | Kosslinger |
| 6,815,147 | B2 | 11/2004 | Fischer |
| 8,846,778 | B2 | 9/2014 | Rygas et al. |
| 10,283,018 | B1 * | 5/2019 | Martin .................. B41M 1/305 |
| 2003/0057443 | A1 | 3/2003 | Dietrich et al. |
| 2011/0103864 | A1 | 5/2011 | Guo et al. |
| 2012/0145515 | A1 | 6/2012 | Kettner-Reich et al. |
| 2014/0184673 | A1 | 7/2014 | Soleimani-Gorgani |

* cited by examiner

Sign Manufacturing System

FIG. 3A
Cutting/Ejection Assembly
FIG. 3B
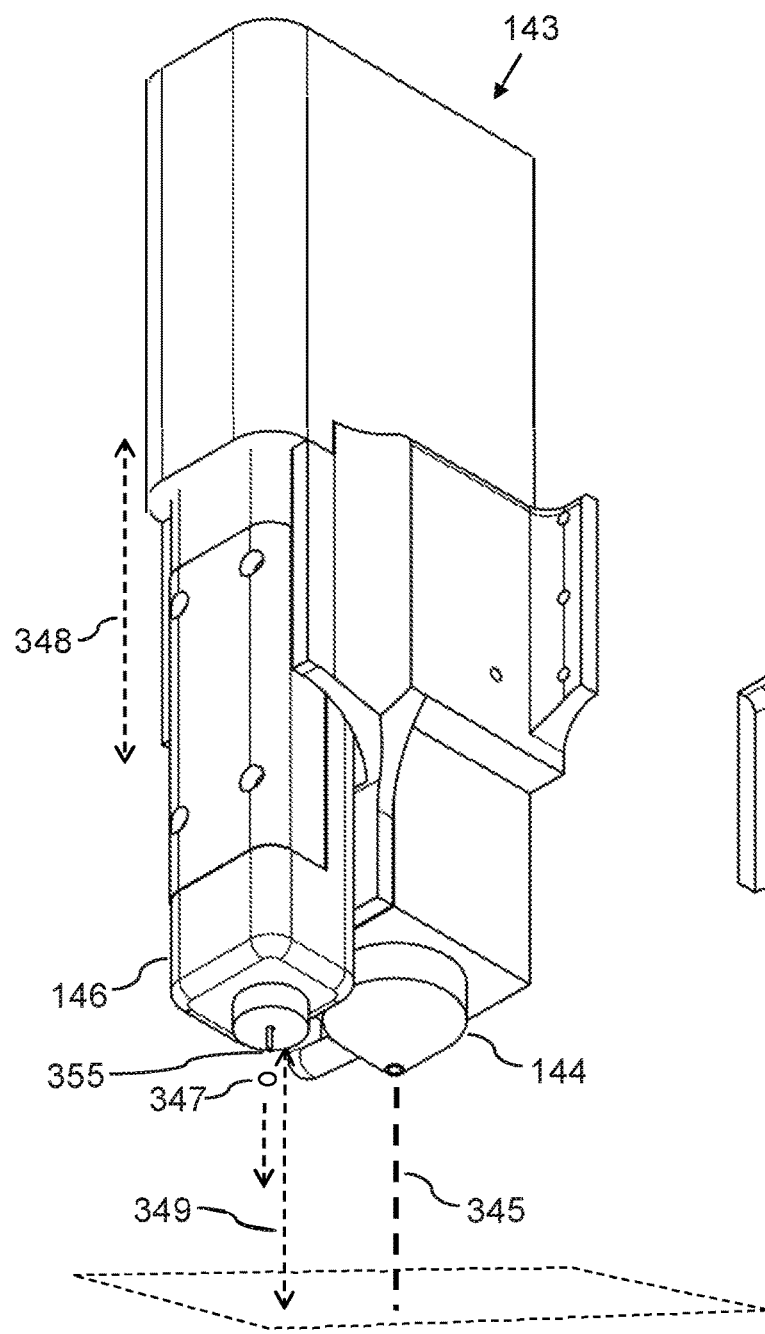
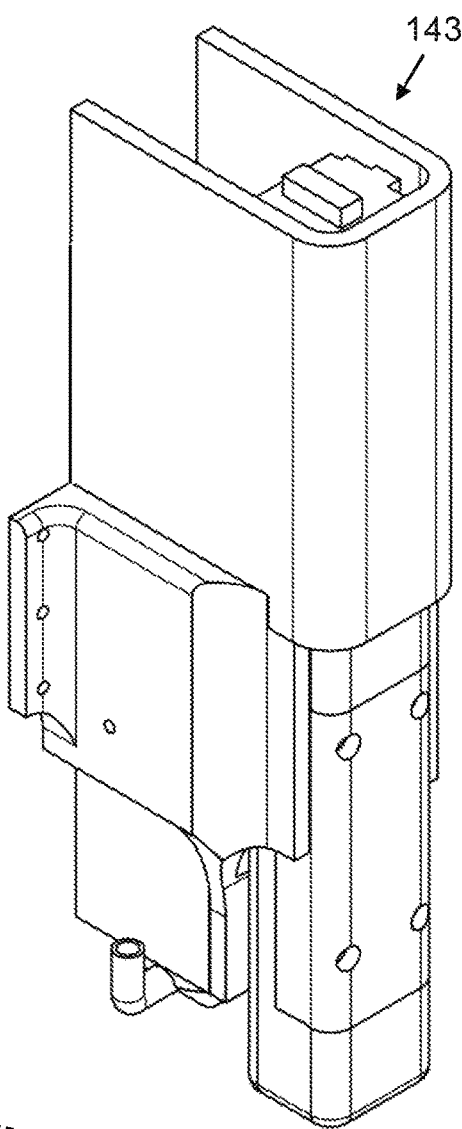

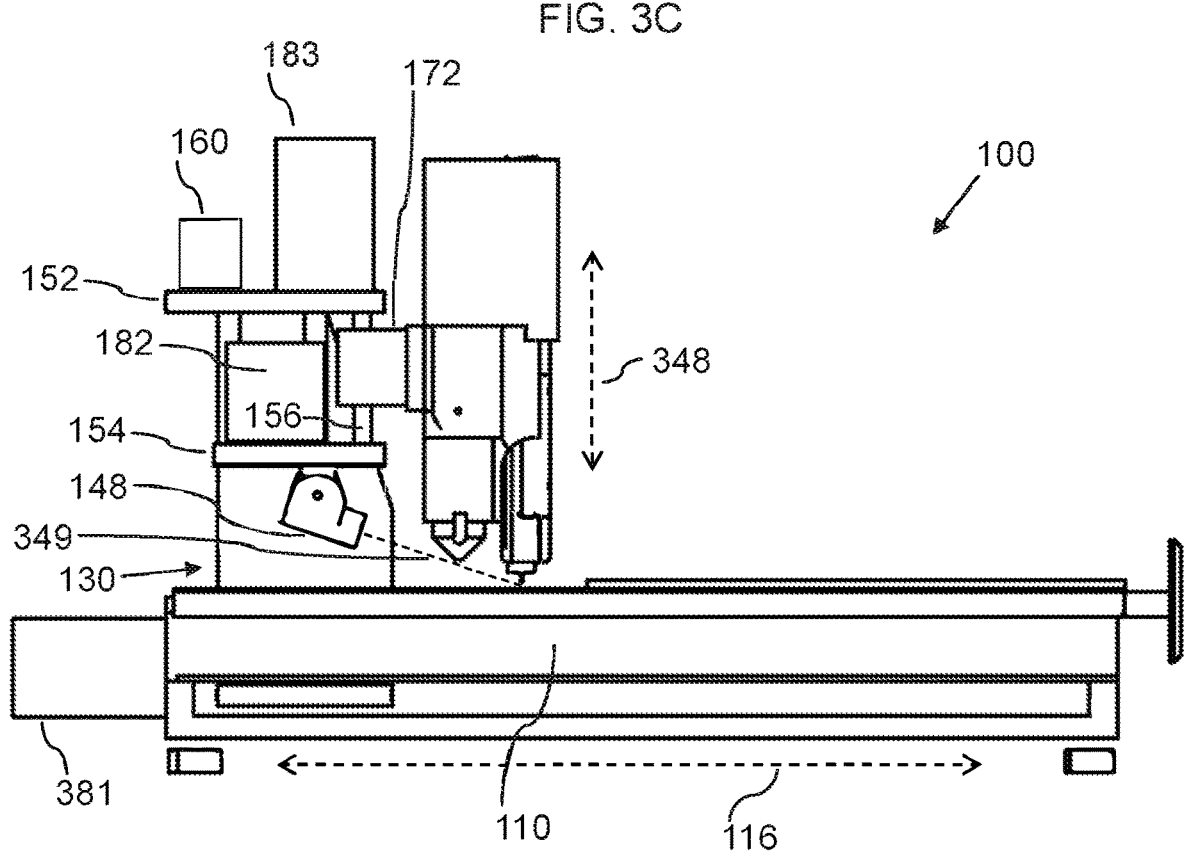

Printing Sheet

Manufactured Sign

Sign Manufacturing System

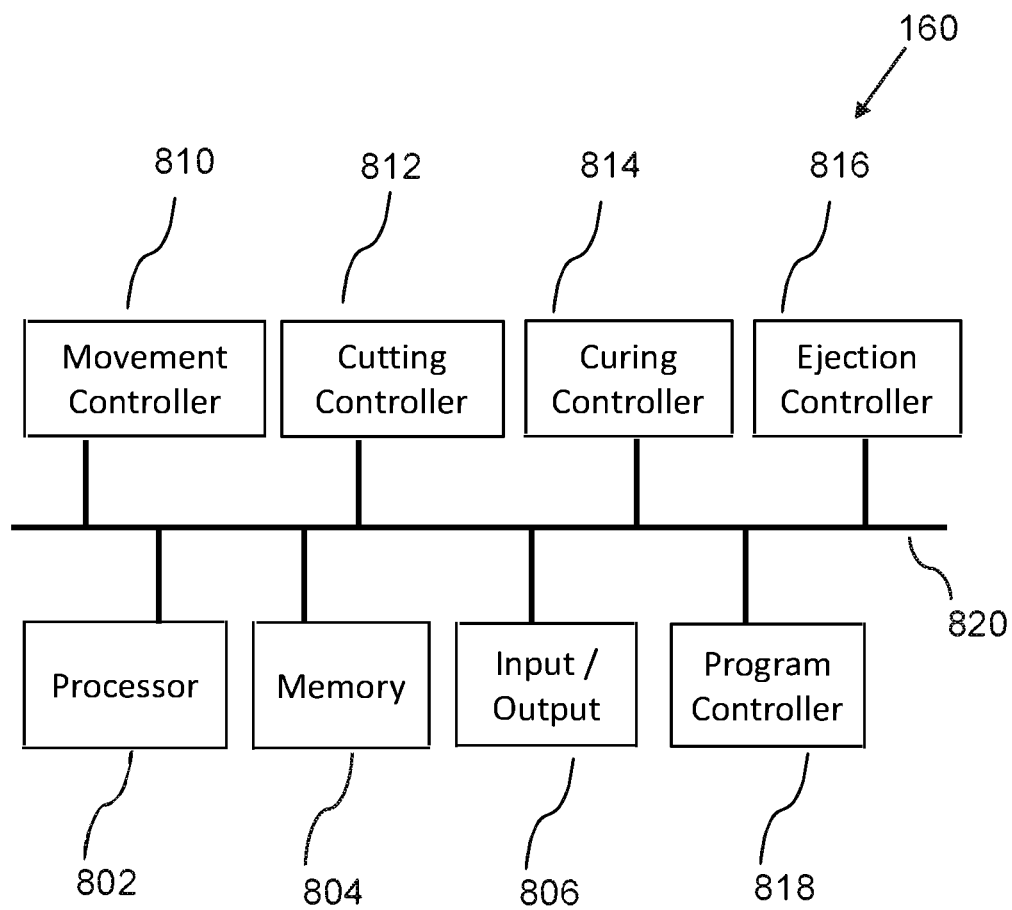

SIGN MANUFACTURING SYSTEM

CROSS-REFERENCE TO RELATED APPLICATIONS

This application claims the benefit of priority of Ser. No. 15/977,421 filed on May 11, 2018. The contents of this application is incorporated by reference herein as if set forth in its entirety.

FIELD OF THE INVENTION

The present invention relates generally to the field of sign manufacturing, and more particularly to methods and systems for ADA (Americans with Disabilities Act) compliant sign manufacturing systems.

BACKGROUND OF THE INVENTION

Manufacturing of ADA compliant sign according to conventional method requires use of complex systems and methods, that necessitate extensive training and are associated with a time-consuming manufacturing process.

As such, considering the foregoing, it may be appreciated that there continues to be a need for novel and improved devices and methods for ADA compliant sign manufacturing.

SUMMARY OF THE INVENTION

The foregoing needs are met, to a great extent, by the present invention, wherein in aspects of this invention, enhancements are provided to the existing model of ADA compliant sign manufacturing.

In an aspect, a sign manufacturing system can include:
a) a printing base;
b) a printing panel, which can be removably positioned on a top surface of the printing base, wherein the printing panel can include:
  a top layer;
  a pressure sensitive adhesive, which is positioned on a bottom surface of the top layer;
  a transparent bottom layer;
  such that the top layer is loosely positioned on a top of the bottom layer, such that the pressure sensitive adhesive is positioned between the top layer and the bottom layer, such that the top layer is loosely connected to the bottom layer;
c) a bridge component, including:
  a right flange, which is slidably connected to a right side of the printing base, such that the right flange protrudes upward from the printing base;
  a left flange, which is slidably connected to a left side of the printing base, such that the left flange protrudes upward from the printing base;
  a bridge connector, including a sliding cavity, such that the bridge connector is connected between the right and left flanges;
  such that the bridge component is configured to slide along a longitudinal direction relative to the printing base;
d) a sliding assembly, including:
  an assembly body, which is slidably connected to the bridge connector, such that the sliding assembly is configured to slide along a lateral direction relative to the printing base;
  a cutting/ejection assembly, including:
    a cutting laser, which is connected to the assembly body, such that a cutting laser beam emitted from the cutting laser is configured to point downward and impact the printing panel; and
    a liquid ejection unit, which is connected to the assembly body, such that an ejection point of the liquid ejection unit is configured to point downward, such that the liquid ejection unit is configured to inject liquid drops of a printing fluid on the printing panel;
  a curing laser, which is slidably connected to the bridge connector, such that the curing laser is configured to slide along the lateral direction of the printing base;
e) a control unit, which is configured to control the sliding motions of the bridge component in the longitudinal direction and of the assembly body in the lateral direction;
wherein the cutting laser emits a cutting laser beam with a predetermined cutting frequency, such that the cutting laser beam interacts with and is absorbed by the top layer, such that the cutting laser beam does not interact with the transparent bottom layer, whereby the cutting laser beam passes through the transparent bottom layer with no effect on the transparent bottom layer;
such that the cutting laser beam cuts through the top layer, such that the control unit is configured to control the sliding motion of the sliding assembly in the longitudinal and lateral directions, to cut characters out of the top layer; such that the characters can be exposed by removing remaining parts of the top layer;
such that the control unit can be configured to control the sliding motion of the sliding assembly, such that the liquid ejection unit can deposit spherical domes/dots of the printing fluid on an exposed surface of the transparent bottom layer, such that the spherical domes form a braille text;
such that a curing laser beam emitted from the curing laser can be pointed at the spherical domes in order to cure and harden the spherical domes.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3A is a left-bottom perspective view of a cutting/ejection assembly, according to an embodiment of the invention.

FIG. 3B is a right-top perspective view of a cutting/ejection assembly, according to an embodiment of the invention.

FIG. 3C is a side cross-sectional view of a sign manufacturing system, according to an embodiment of the invention.

FIG. 8 is a schematic diagram illustrating a control unit, according to an embodiment of the invention.

DETAILED DESCRIPTION

Figure 1:
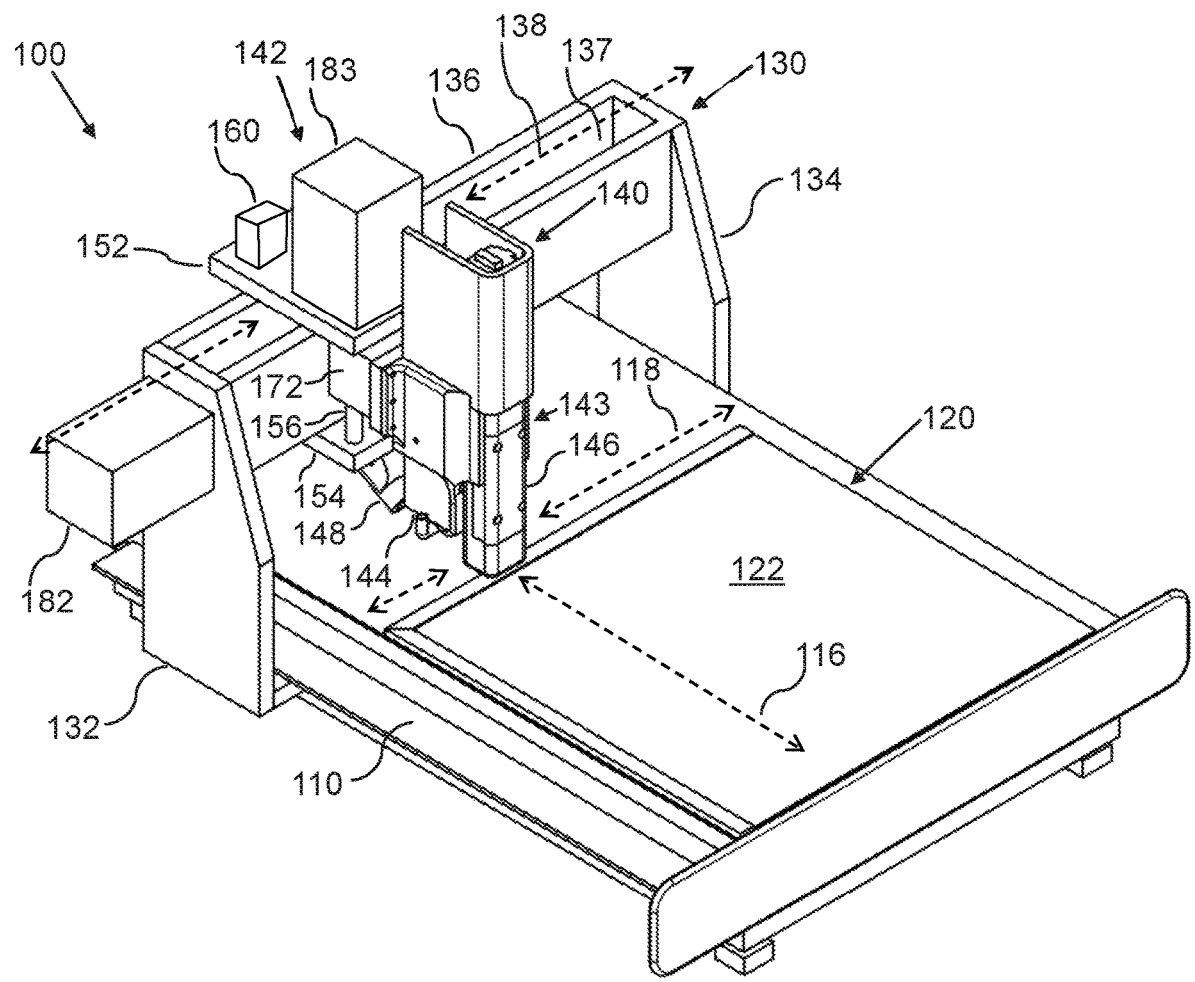
FIG. 1 is a perspective view of a sign manufacturing system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a sign manufacturing system 100 with reference to FIG. 1, in such manner that like reference numerals refer to like components throughout; a convention that we shall employ for the remainder of this specification.

Figure 4A:
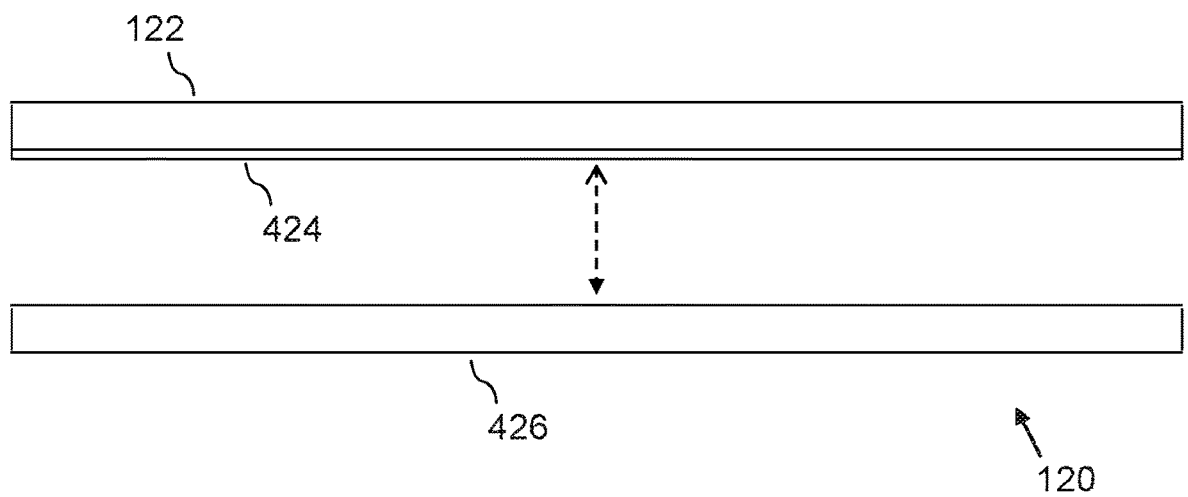
FIG. 4A is a schematic cross-sectional diagram of a printing panel prior to assembly, according to an embodiment of the invention.
Figure 4B:
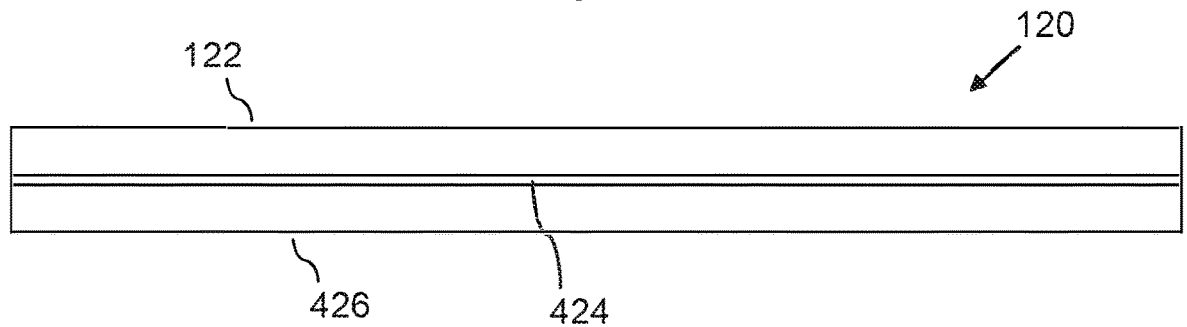
FIG. 4B is a schematic cross-sectional diagram of a printing panel, according to an embodiment of the invention.
Figure 5:
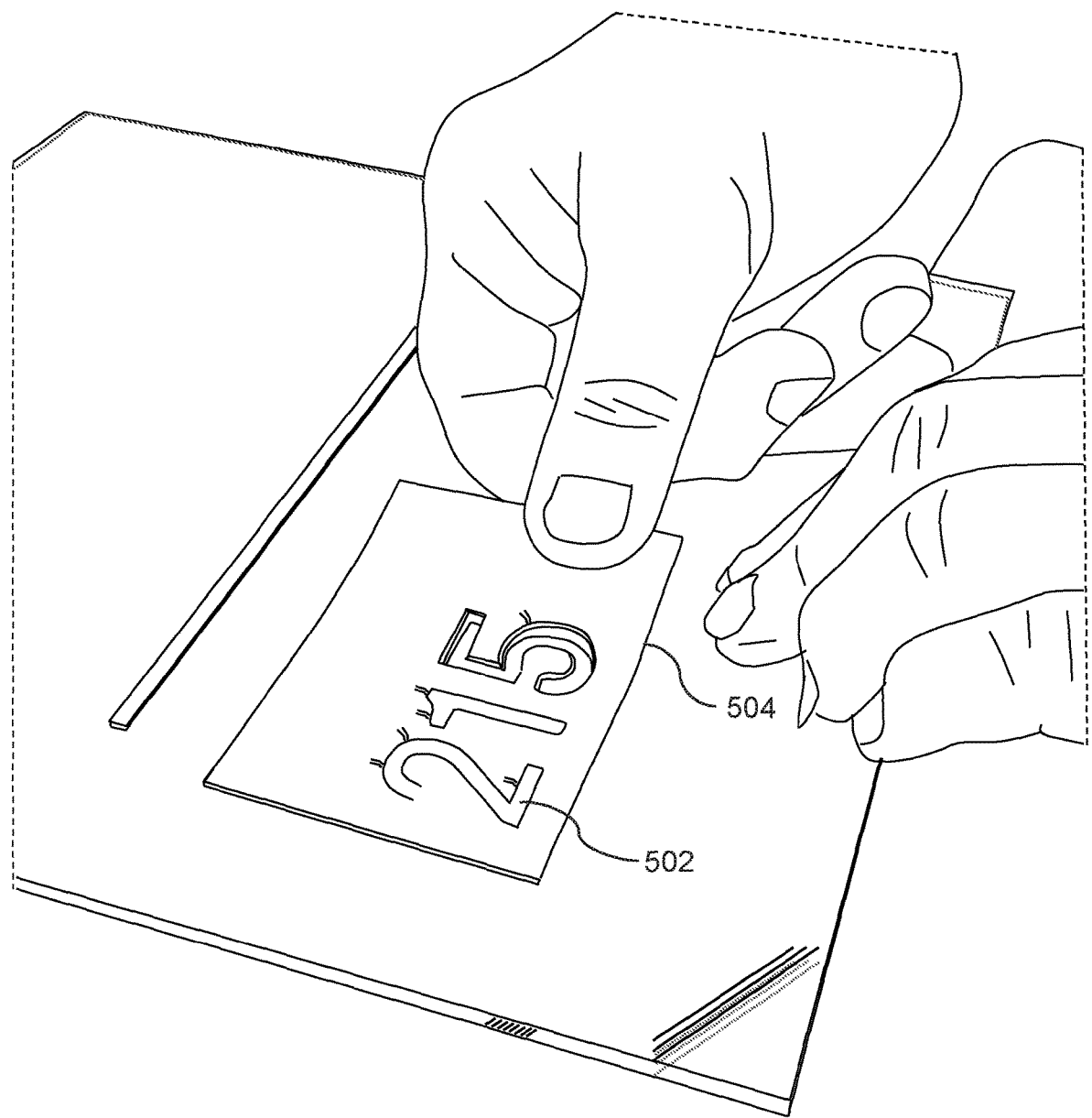
FIG. 5 is a perspective of a printing panel during manufacturing, according to an embodiment of the invention.
Figure 6:
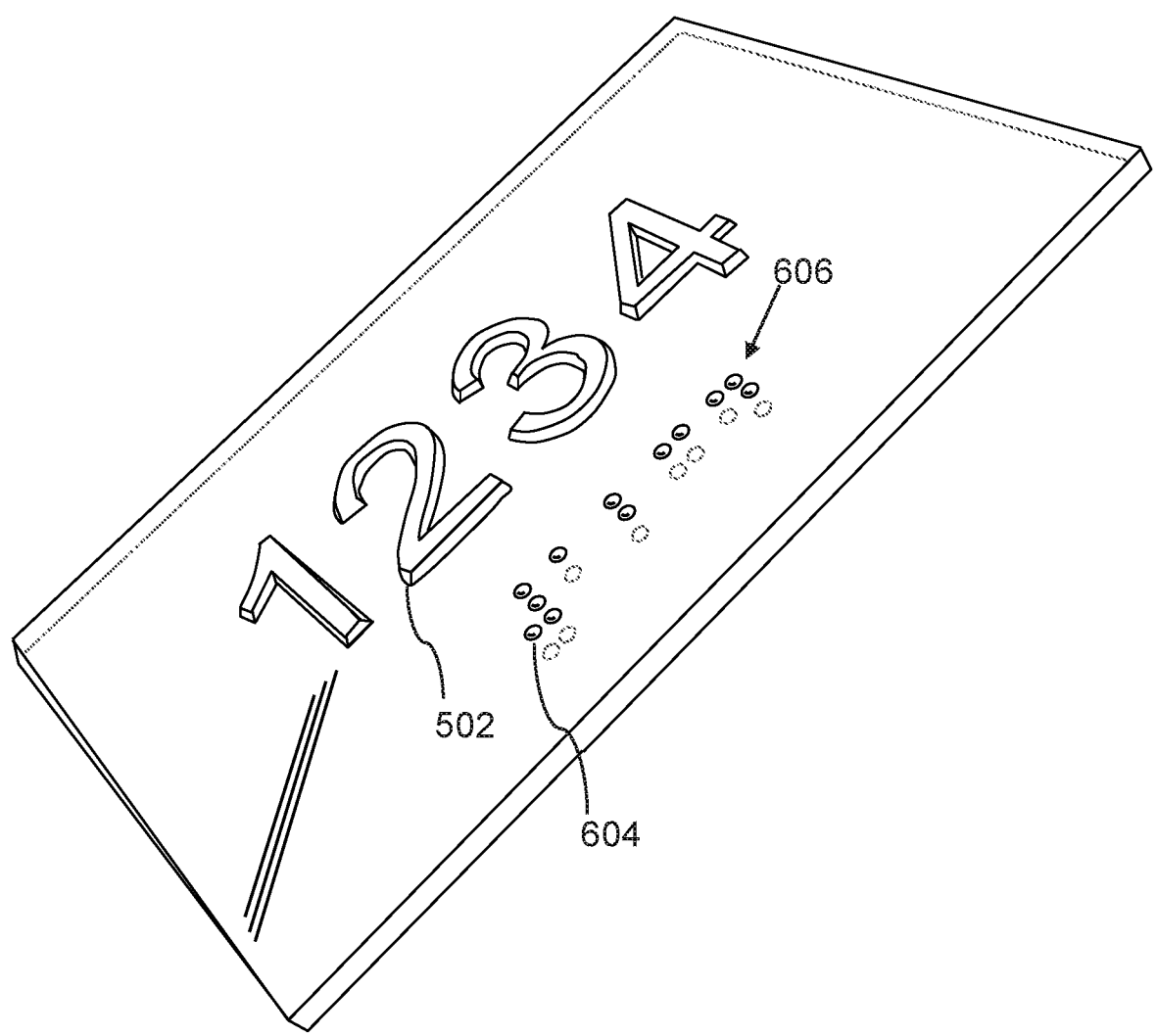
FIG. 6 is a perspective of a manufactured printing panel, according to an embodiment of the invention.

In an embodiment, a sign manufacturing system 100 can include:
a) a printing base 110;
b) a printing panel 120, which can be removably positioned on a top surface of the printing base 110, wherein the printing panel (as shown in FIGS. 4A and 4B) includes:
  i. a top layer 122;
  ii. a pressure sensitive adhesive 424, which is positioned on a bottom surface of the top layer 122;
  iii. a transparent bottom layer 426;
  such that the top layer 122 is loosely positioned on a top of the transparent bottom layer 426, such that the pressure sensitive adhesive 424 is positioned between the top layer 122 and the bottom layer 426, such that the top layer 122 is loosely connected to the bottom layer 426;
c) a bridge component 130, which can be slidably connected to the printing base 110, the bridge component 130 including:
  i. a right flange 132, which is slidably connected to a right side of the printing base 110, such that the right flange 132 protrudes upward from the printing base 110;
  ii. a left flange 134, which is slidably connected to a left side of the printing base 110, such that the left flange 134 protrudes upward from the printing base 110;
  iii. a bridge connector 136, including a sliding cavity 137, such that the bridge connector 136 is connected between the right and left flanges 132 134;
  such that the bridge component 130 (and thereby the bridge connector 136) can be configured to slide 116 along a longitudinal direction 116 relative to the printing base 110;
d) a sliding assembly 140, which can include:
  i. an assembly body 142, which is slidably connected to the bridge connector 136, such that the sliding assembly 140 is configured to slide along a lateral direction 118 relative to the printing base 110 (corresponding to a longitudinal direction 138 of the bridge connector 136);
  ii. A cutting/ejection assembly 143, which can also be referred to as a cutting and ejection assembly 143, including:
    a cutting laser 144, which is connected to the assembly body 142, such that a cutting laser beam 345 (shown in FIG. 3) emitted from the cutting laser 144 is configured to point downward and impact (i.e. hit) the printing panel 120 that is positioned on a top surface of the printing base 110; and
    a liquid ejection unit 146, which is connected to the assembly body 142, such that an ejection point 355 of the liquid ejection unit 146 is configured to point downward, such that the liquid ejection unit 146 is configured to inject liquid drops 347 of a printing fluid 347 on the printing panel 120;
  iii. a curing laser 148, as shown in FIGS. 1 and 3C, which is slidably connected to the bridge connector 136, such that the curing laser 148 is configured to slide along the lateral direction 118 of the printing base 110;
e) a control unit 160, which is configured to control the sliding motions of the bridge component 130 in the longitudinal direction 116 and of the assembly body 142 in the lateral direction 118, such that the control unit 160 for example as shown can be mounted on the assembly body 142;
wherein the cutting laser 144 is configured to emit a cutting laser beam 345 with a predetermined cutting frequency, such that the cutting laser beam 345 interacts with and is absorbed by the top layer 122, such that the cutting laser beam 345 does not interact with the transparent bottom layer 426, whereby the cutting laser beam 345 passes through the transparent bottom layer 426 with no effect on the transparent bottom layer 426;
such that the cutting laser beam 345 is configured to cut through the top layer 122, such that the control unit 160 is configured to control the sliding motion of the sliding assembly 140 in the longitudinal 116 and lateral 118 directions, to cut characters 502 out of the top layer, as shown in FIGS. 5 and 6;

such that the characters can be exposed by removing remaining parts 504 of the top layer 122 to form tactile raised letters;

such that the control unit 160 can be configured to control the sliding motion of the sliding assembly 140, such that the liquid ejection unit 146 can deposit spherical domes/dots 604 of the printing fluid on an exposed surface of the transparent bottom layer 426, such that the spherical domes 604 form a braille text 606 of raised braille elements;

such that a curing laser beam 349 emitted from the curing laser 148 can be pointed at the spherical domes 604 in order to cure and harden the spherical domes 604.

In a related embodiment, after removal of the remaining parts 504 of the top layer 122, the top layer 122 and the transparent bottom layer 426 can be pressed together (for example manually by an operator/user of the sign manufacturing system 100), such that the top layer 122 and the transparent bottom layer 426 become firmly adhered, to form a finished printing panel 420.

In a related embodiment, as shown in FIGS. 3A and 3C, the cutting/ejection assembly 143 can be slidably connected to the assembly body 142 (and thereby to the bridge component 130), such that the sliding assembly 140 can be configured to enable the cutting/ejection assembly 143 to slide altitudinally 348 (i.e. up and down/vertically 348), to adjust a height 349 between an ejection point 355 of the liquid ejection unit 146 and the printing panel 120 (such as for example an exposed surface of the transparent bottom layer 426). The height 349 is shown exaggerated from a typical height 349 in FIG. 3C, for illustrative purposes. FIGS. 1 and 3C show typical heights 349 during use. In some related embodiments, the sliding assembly 140 can be configured to enable solely the liquid ejection unit 146 to slide vertically 348 (i.e. up and down/altitudinal 348), to adjust a height 349 between an ejection point 355 of the liquid ejection unit 146 and the printing panel 120.

In a further related embodiment, as shown in FIGS. 1 and 3C, the assembly body 142 of the sliding assembly 140, can further include
a) an upper arm 152;
b) a lower arm 154; and
c) a vertical column 156, which is connected between the upper and lowers arms 152 154;

such that the assembly body 142 is slidably connected to the bridge connector 136 with the upper and lower arms 152 154 mounted above and below the bridge connector 136, such that the assembly body 142 is configured to slide along a lateral direction 118 relative to the printing base 110 (corresponding to a longitudinal direction 138 of the bridge connector 136);

such that the cutting/ejection assembly 143 is slidably connected to the vertical column 156, such that the cutting/ejection assembly 143 can slide vertically 348 (i.e. up and down/altitudinal 348), to adjust a height 349 between an ejection point 355 of the liquid ejection unit 146 and the printing panel 120 (such as for example an exposed surface of the transparent bottom layer 426).

In a yet further related embodiment, as shown in FIGS. 1, the cutting/ejection assembly 143 can further include an assembly connector 172, which is slidably connected to the vertical column 156, such that the liquid ejection unit 146 and the cutting laser 144 are connected to the assembly connector.

In a related embodiment, the printing fluid/resin 347 can be an optically sensitive resin, such as optically sensitive resins used as dental adhesives or adhesives for industrial use, including resin/adhesive compositions of N,N-Dimethylacrylamide, Isobornyl Acrylate, at least one photoinitiator, a silane coupling agent, and combinations thereof.

In a related embodiment, dimensions of the sign manufacturing system 100 significantly reduces the training needed for manufacturing of ADA signs and speeds up the process in order of 4 to 8 times in comparison to conventional methods and systems.

In a related embodiment, dimensions of the sign manufacturing system 100 can be approx. 2'×2'×2', and weight approx. 100 lbs.

Figure 2A:
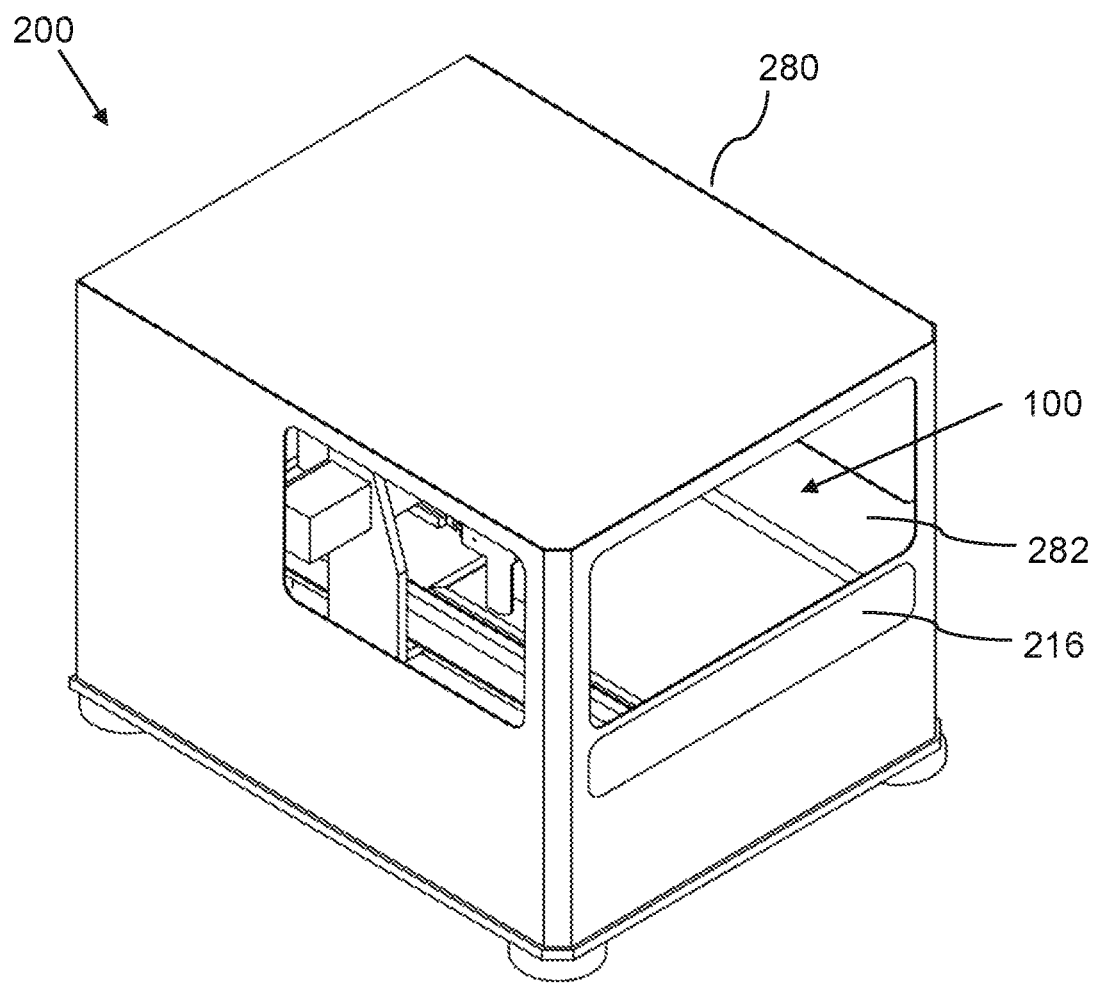
FIG. 2A is a perspective view of an enclosed sign manufacturing system, according to an embodiment of the invention.

In a related embodiment, as shown in FIG. 2A, the sign manufacturing system 100 can further include, i.e. be enclosed in, an enclosure 280 to form an enclosed sign manufacturing system 200, such that the printing base 110, printing panel 120, bridge component 130, sliding assembly 140, and control unit 160 are positioned inside the enclosure 280. The enclosure 280 can further include at least one window 282, or a plurality of windows 282, which can be open apertures or transparent panes.

Figure 2B:
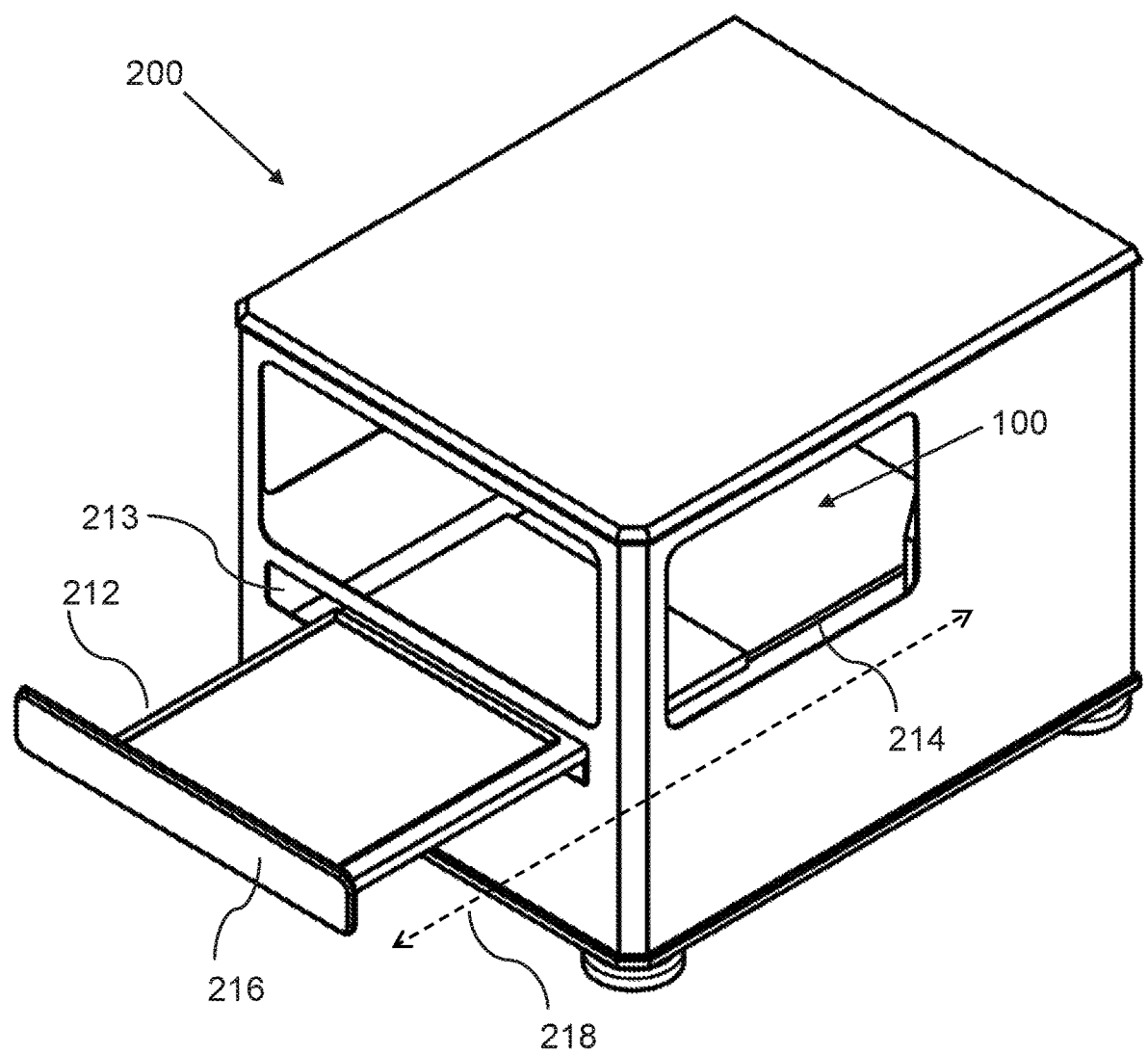
FIG. 2B is a perspective view of an enclosed sign manufacturing system, according to an embodiment of the invention.

In a related embodiment, as shown in FIG. 2B, the printing base can further include a top sliding part 212 and a bottom stationary base 214, such that the top sliding part 212 is configured to slide out parallel to the bottom base 214.

In a further related embodiment, the enclosure 210 can further include a printing base aperture 213, such that the top sliding part 212 can slide out to provide access for insertion or removal of a printing panel 120.

In a yet further related embodiment, the printing base 110 can further include a front plate 216 that is perpendicularly connected to a front of the top sliding part 212, such that the front plate closes the printing base aperture 213, when the top sliding part 212 is fully inserted into the enclosure, as shown in FIG. 2A. The printing base 110 is thereby configured as a drawer that can be pulled out to insert or remove the printing panel 120.

In another related embodiment, the cutting laser 144 can be configured such that the cutting laser beam 345 has a wavelength of approximately 445 nm, or is in a range of 443-447 nm, 440-450 nm, or a wider range.

In another related embodiment, the cutting laser 144 can be configured such that the cutting laser beam 345 has a power output of approximately 5 W, or is in a range of 4-6 W, 3-7 W, 4-10 W, 2-10 W, or a wider range.

In another related embodiment, the curing laser 148 can be configured such that the curing laser beam 349 has a wavelength of approximately 405 nm, or is in a range of 403-407 nm, 400-410 nm, or a wider range.

In another related embodiment, the curing laser 148 can be configured such that the curing laser beam 349 can have a power output of approximately/substantially 20 mW, or be in a range of 5-40 mW, 10-40 mw, 5-100 mW, 20-500 mW, or a wider range. The cutting laser beam can be configured with a diameter of approximately/substantially 0.5 mm, or can have a diameter in a range of 0.2-1 mm, or a wider range.

In a related embodiment, the top layer 122 can be made from an ADA compliant engraving plastic material, such as ROWLAND™ ADA ALTERNATIVE™.

In yet a related embodiment, the transparent bottom layer 426 can be made from a transparent acrylic material, such as ACRYLITE™ acrylic sheet, manufactured by EVONIK INDUSTRIES™.

Figure 4C:
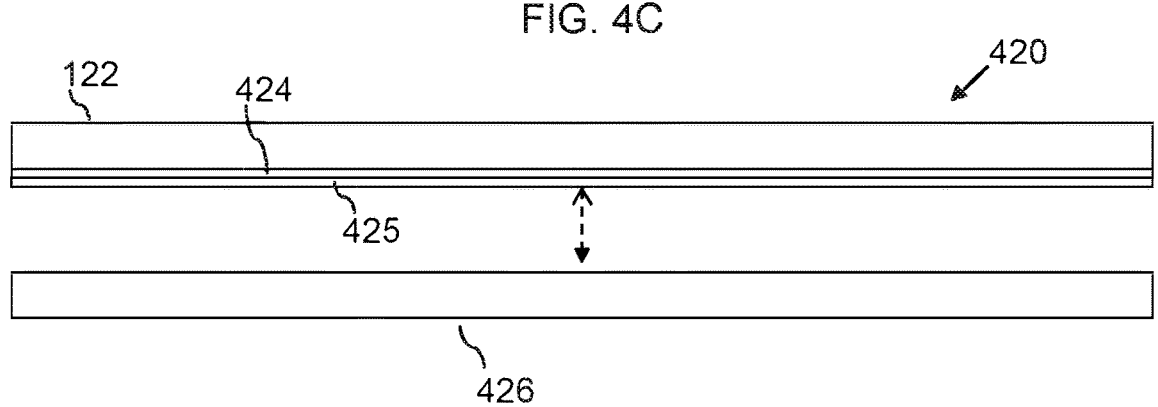
FIG. 4C is a schematic cross-sectional diagram of a printing panel prior to assembly, according to an embodiment of the invention.
Figure 4D:
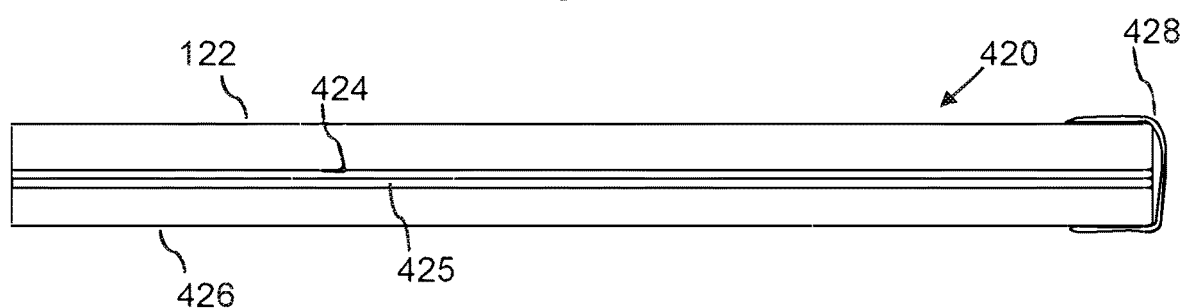
FIG. 4D is a schematic cross-sectional diagram of a printing panel, according to an embodiment of the invention.
Figure 4E:
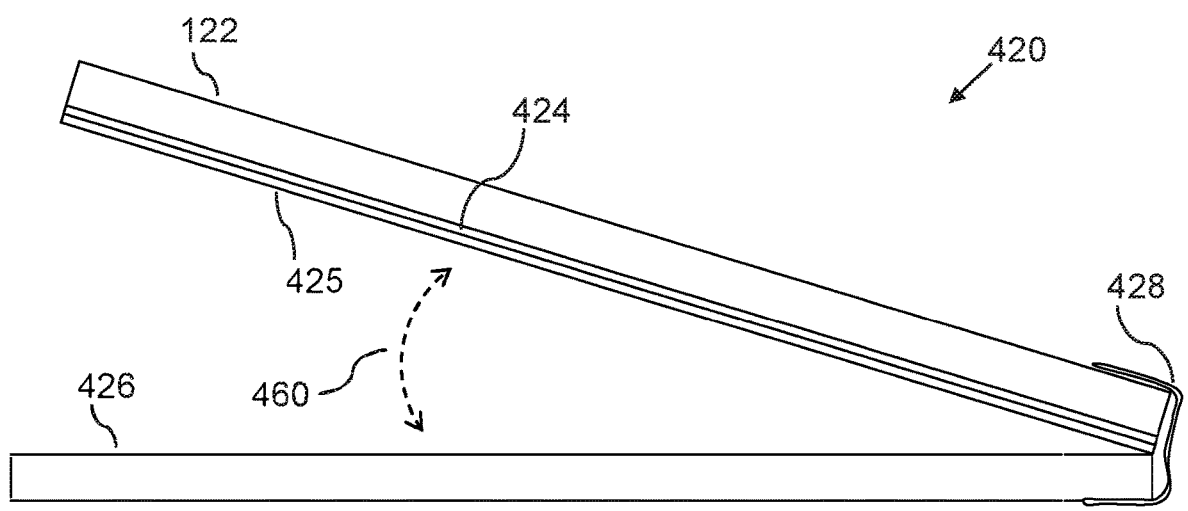
FIG. 4E is a schematic cross-sectional diagram of a printing panel in an opened configuration, according to an embodiment of the invention.

In a related embodiment, as shown in FIGS. 4C, 4D, and 4E, the printing panel 420 can further include a protective layer/liner 425, which can be a paper liner/sheet 425, which is positioned on a bottom surface of the pressure sensitive adhesive 424, such that the protective liner 425 is configured to be removable/removed prior to adhering the top layer to the bottom layer, to expose the pressure sensitive adhesive 424.

In a further related embodiment, as shown in FIGS. 4D, and 4E, the printing panel 420 can further include at least one piece of adhesive tape 428 (also called sticky tape 428), which is configured to be removable, and can for example be a masking tape 428, such that the at least one piece of adhesive tape 428 is positioned on one side of the printing panel 420, and connected in a first end to an upper surface of the top layer 122 and in a second end to a lower surface of the transparent bottom layer 426, such that the at least one piece of adhesive tape 428 functions as a hinge 428, such that the top layer 122 and the transparent bottom layer 426 are hingedly/pivotably connected, such that (as shown in FIG. 4E), the printing panel 420 can be opened by pivoting 460 the top layer 122 away from the transparent bottom layer 426, such that after cutting of the characters 502, characters can be exposed by removing remaining parts 504 of the top layer 122 to form tactile raised letters, and the protective liner 425 can be removed prior to pivoting the back to a closed position, and removing the at least one piece of adhesive tape 428, pressing the top layer 122 and transparent bottom layer 426 together, to form a finished printing panel 420.

Figure 7:
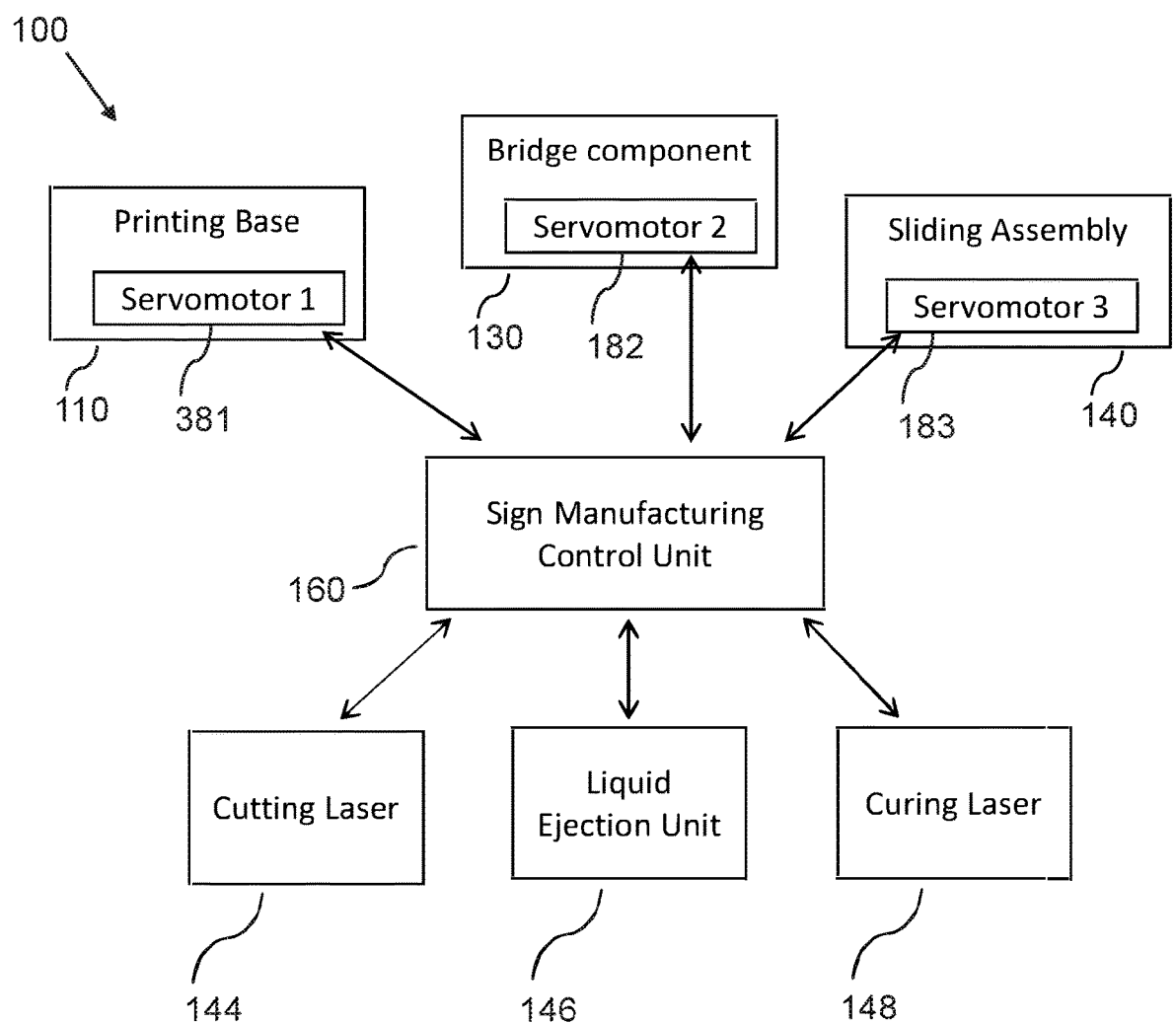
FIG. 7 is a schematic diagram illustrating a sign manufacturing system, according to an embodiment of the invention.

In a related embodiment, as shown in FIG. 7, a sign manufacturing system 100 can include:
a) a control unit 160;
b) a bridge component 130, which is connected to the control unit 160, wherein the bridge component 130 is configured to slide 116 along a longitudinal direction 116 relative to the printing base 110, under control of the control unit 160;
c) a sliding assembly 140, which is connected to the control unit 160, wherein the sliding assembly 140 is configured to slide 118 along a lateral direction 118 relative to the printing base 110, under control of the control unit 160;
d) a cutting laser 144, which is connected to the control unit 160, such that the control unit 160 controls emission of a cutting laser beam 345 from the cutting laser 144;
e) a liquid ejection unit 146, which is connected to the control unit 160, such that the control unit 160 controls ejection of liquid drops 347 of a printing fluid from the liquid ejection unit 146; and
f) a curing laser 148, which is connected to the control unit 160, such that the control unit 160 controls emission of a curing laser beam 349 from the curing laser 148.

In a related embodiment:
a) The printing base 110 can include a first servo motor 381, as shown in FIGS. 3C and 7, such that the control unit 160 controls the first servo motor 381 to control a longitudinal sliding movement 116 of the bridge component 130. The first servo motor 381 can for example be a linear or rotational actuator;
b) The bridge component 130 can include a second servo motor 182, as shown in FIGS. 1, 3C, and 7, such that the control unit 160 controls the second servo motor 182 to control a lateral sliding movement 118 of the sliding assembly 140. The second servo motor 182 can for example be a linear or rotational actuator; and
c) The sliding assembly 140 can include a third servo motor 183, as shown in FIGS. 1, 3C, and 7, such that the control unit 160 controls the third servo motor 183 to control a vertical sliding movement 348 of the liquid ejection unit 146. The third servo motor 183 can for example be a linear or rotational actuator.

In a related embodiment, as shown in FIG. 8, the control unit 160 can include:
a) A processor 802;
b) A non-transitory memory 804;
c) An input/output 806;
d) A movement controller 810, which is configured to:
i. control the first servo motor 381 to control a longitudinal sliding movement 116 of the bridge component 130;
ii. control the second servo motor 182 to control a lateral sliding movement 118 of the sliding assembly 140; and
iii. control the third servo motor 183 to control an altitudinal/vertical sliding movement 348 of the liquid ejection unit 146;
e) A cutting controller 812, which is configured to control emission of the cutting laser beam 345 from the cutting laser 144;
f) A curing controller 814, which is configured to control emission of the curing laser beam 349 from the curing laser 148;
g) An ejection controller 816, which is configured to control ejection of liquid drops 347 from the liquid ejection unit 146; all connected via
h) A data bus 820.

In an embodiment, a sign manufacturing system 100 can include:
a) a printing base 110;
b) a printing panel 120, which can be removably positioned on a top surface of the printing base 110, wherein the printing panel (as shown in FIGS. 4A and 4B) includes:
i. a top layer 122;
ii. a pressure sensitive adhesive 424, which is positioned on a bottom surface of the top layer 122;
iii. a transparent bottom layer 426;
such that the top layer 122 is loosely positioned on a top of the transparent bottom layer 426, such that the pressure sensitive adhesive 424 is positioned between the top layer 122 and the bottom layer 426, such that the top layer 122 is loosely connected to the bottom layer 426;
c) a sliding assembly 140, including:
i. an assembly body 142, which is slidably connected to the printing base 110, such that the sliding assembly 140 is configured to slide along a longitudinal direction 116 and a lateral direction 118 relative to the printing base 110;
ii. A cutting/ejection assembly 143, which can also be referred to as a cutting and ejection assembly 143, including:
a cutting laser 144, which is connected to the assembly body 142, such that a cutting laser beam 345 (shown in FIG. 3A) emitted from the cutting laser 144 is configured to point downward and impact (i.e. hit) the printing panel 120 that is positioned on a top surface of the printing base 110; and
a liquid ejection unit 146, which is connected to the assembly body 142, such that an ejection point 355 of the liquid ejection unit 146 is configured to point downward, such that the liquid ejection unit 146 is configured to inject liquid drops 347 of a printing fluid 347 on the printing panel 120; and
iii. a curing laser 148, as shown in FIGS. 1 and 3C, which is connected to the assembly body 142;

wherein the cutting laser 144 is configured to emit a cutting laser beam 345 with a predetermined cutting frequency, such that the cutting laser beam 345 interacts with and is absorbed by the top layer 122, such that the cutting laser beam 345 does not interact with the transparent bottom layer 426, whereby the cutting laser beam 345 passes through the transparent bottom layer 426 with no effect on the transparent bottom layer 426;

such that the cutting laser beam 345 is configured to cut through the top layer 122, with control of a sliding motion of the sliding assembly 140 in the longitudinal 116 and lateral 118 directions, to cut characters 502 out of the top layer, as shown in FIGS. 5 and 6;

such that the characters can be exposed by removing remaining parts 504 of the top layer 122 to form tactile raised letters;

such that the liquid ejection unit 146 can deposit spherical domes/dots 604 of the printing fluid on an exposed surface of the transparent bottom layer 426, such that the spherical domes 604 form a braille text 606 of raised braille elements;

such that a curing laser beam 349 emitted from the curing laser 148 can be pointed at the spherical domes 604 in order to cure and harden the spherical domes 604.

In a related embodiment, as shown in FIGS. 3A, 3B, and 3C, the cutting/ejection assembly 143 can be slidably connected to the assembly body 142 (and thereby to the bridge component 130), such that the sliding assembly 140 can be configured to enable the cutting/ejection assembly 143 to slide altitudinally 348 (i.e. up and down/vertically 348), to adjust a height 349 between an ejection point 355 of the liquid ejection unit 146 and the printing panel 120 (such as for example an exposed surface of the transparent bottom layer 426). The height 349 is shown exaggerated from a typical height 349 in FIG. 3C, for illustrative purposes. FIGS. 1 and 3C show typical heights 349 during use. In some related embodiments, the sliding assembly 140 can be configured to enable solely the liquid ejection unit 146 to slide vertically 348 (i.e. up and down/altitudinal 348), to adjust a height 349 between an ejection point 355 of the liquid ejection unit 146 and the printing panel 120.

In a related embodiment, as shown in FIGS. 3A, 3B, and 3C, the liquid ejection unit 146 can be configured to slide altitudinally 348 (i.e. up and down/vertically 348), to adjust a height 349 between an ejection point 355 of the liquid ejection unit 146 and the printing panel 120 (such as for example an exposed surface of the transparent bottom layer 426). The liquid ejection unit 146 can for example be slidably connected to the assembly body 142, either separately or with the entire cutting/ejection assembly 143, as shown, or the assembly body 142 can be configured to slide altitudinally.

In further related embodiments, the disclosure of the sign manufacturing system 100 should be understood to include the use of various well-known mechanisms for longitudinal, lateral, and altitudinal movement of the cutting laser 144, liquid ejection unit 146, and the curing laser 148. Thus, the assembly body 142 should be understood to include various related designs in use for additive and robotic manufacturing, including robotic arms, controllable "gooseneck" arms, and other designs permitting lateral and longitudinal positional adjustment and height adjustment over a printing surface.

In a related embodiment, the control unit 160 can further include a program controller 818, which can be loaded with artwork to execute a manufacturing script to manufacture a sign with the artwork, such that a user can load artwork, place a blank printing panel 120 onto the printing base/tray 110, press START, wait a few minutes during manufacturing operation, then remove the manufactured print panel/sign 120 from the machine, such that the manufactured sign 120 only requires minor cleaning up.

FIGS. 1, 7, and 8 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 7, and 8 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the control unit 160 are to be interpreted in the most general manner.

For example, the processors 802 can include a single physical microprocessor or microcontroller, a cluster of processors, a datacenter or a cluster of datacenters, a computing cloud service, and the like.

In a further example, the non-transitory memory 804 can include various forms of non-transitory storage media, including random access memory and other forms of dynamic storage, and hard disks, hard disk clusters, cloud storage services, and other forms of long-term storage. Similarly, the input/output 806 can include a plurality of well-known input/output devices, such as screens, keyboards, pointing devices, motion trackers, communication ports, and so forth.

Furthermore, it shall be understood that the control unit 160 can include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the control unit 160 can communicate with external devices, such as an app executing on a smartphone, over a network, which can include the general Internet, a Wide Area Network or a Local Area Network, or another form of communication network, transmitted on wired or wireless connections. Wireless networks can for example include Ethernet, Wi-Fi, BLUETOOTH™, ZIG-BEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the sign manufacturing system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

The invention claimed is:

1. A sign manufacturing system, comprising:
   a) a printing base;
   b) a printing panel removably positioned on a top surface of the printing base, the printing panel comprising:
      a top layer,
      a pressure sensitive adhesive, and
      a transparent bottom layer,
      the pressure sensitive adhesive positioned between the top layer and the transparent bottom layer;
   c) a first component connected to the printing base, the component being configured to slide along a longitudinal direction relative to the printing base; and
   d) a second component, including:
      an assembly body connected to the first component, such that the assembly body is configured to slide along a lateral direction relative to the printing base; and
      a laser connected to the assembly body,
   wherein the laser is configured to emit a laser beam configured to point downward and impact the printing panel;
   wherein the laser beam is configured to cut characters out of the top layer, such that the characters are exposed by removing parts of the top layer.

2. The sign manufacturing system of claim 1, wherein the laser beam interacts with and is absorbed by the top layer,
   the laser beam does not interact with the transparent bottom layer, and
   the laser beam passes through the transparent bottom layer with no effect on the transparent bottom layer.

3. The sign manufacturing system of claim 1, wherein the laser beam has a predetermined frequency.

4. The sign manufacturing system of claim 3, wherein the second component further comprises:
   a liquid ejection unit, which is connected to the assembly body, such that an ejection point of the liquid ejection unit is configured to point downward,
   wherein the liquid ejection unit is configured to inject liquid drops of a printing fluid on the printing panel, and
   wherein the liquid ejection unit is configured to deposit spherical domes of the printing fluid on an exposed surface of the transparent bottom layer, such that the spherical domes form a braille text.

5. The sign manufacturing system of claim 4, wherein the liquid ejection unit is configured to slide altitudinally, to adjust a height between an ejection point of the liquid ejection unit and the printing panel.

6. The sign manufacturing system of claim 5, wherein the liquid ejection unit is slidably connected to the assembly body.

7. The sign manufacturing system of claim 4, wherein the second component further comprises:

a curing laser, which is slidably connected to the assembly body;
wherein the curing laser is configured to slide along the lateral direction relative to the printing base; and
wherein the curing laser is configured to emit a curing laser beam, which is pointed at the spherical domes in order to cure and harden the spherical domes.

8. The sign manufacturing system of claim 1, further comprising:
e) a control unit, which is configured to control sliding motions of the first component in the longitudinal direction and of the assembly body in the lateral direction.

9. The sign manufacturing system of claim 8, wherein the control unit comprises:
a) a processor;
b) a non-transitory memory;
c) an input/output; and
d) a movement controller, which is configured to control a longitudinal sliding movement of the first component and control a lateral sliding movement of the second component.

10. The sign manufacturing system of claim 9, wherein the control unit further comprises:
a cutting controller, which is configured to control emission of the cutting laser beam from the cutting laser.

11. The sign manufacturing system of claim 9, wherein the control unit further comprises:
an ejection controller, which is configured to control ejection of liquid drops from the liquid ejection unit.

12. The sign manufacturing system of claim 11, wherein the control unit further comprises:
a curing controller, which is configured to control emission of the curing laser beam from the curing laser.

13. The sign manufacturing system of claim 1, wherein the second component is configured to enable the assembly body to slide altitudinally, to adjust a height between an ejection point of the liquid ejection unit and the printing panel.

14. The sign manufacturing system of claim 1, wherein the printing panel further comprises:
a) a protective liner, which is positioned on a bottom surface of the pressure sensitive adhesive, such that the protective liner is configured to be removable; and
b) at least one piece of adhesive tape, which is configured to be removable;
such that the at least one piece of adhesive tape is positioned on one side of the printing panel, and connected in a first end to an upper surface of the top layer and in a second end to a lower surface of the transparent bottom layer,
such that the at least one piece of adhesive tape is configured to function as a hinge, such that the top layer and the transparent bottom layer are hingedly connected.

15. A sign manufacturing system, comprising:
a) a printing base;
b) a printing panel, which is removably positioned on a top surface of the printing base, wherein the printing panel comprises:
a top layer,
a pressure sensitive adhesive, and
a transparent bottom layer,
wherein the pressure sensitive adhesive is positioned between the top layer and the transparent bottom layer;
c) a first component slidably connected to the printing base, the component being configured to slide along a longitudinal direction relative to the printing base; and
d) a second component, including:
an assembly body slidably connected to the first component, such that the assembly body is configured to slide along a lateral direction relative to the printing base; and
a liquid ejection unit, which is connected to the assembly body, such that an ejection point of the liquid ejection unit is configured to point downward, such that the liquid ejection unit is configured to inject liquid drops of a printing fluid on the printing panel; and
wherein the liquid ejection unit deposits spherical domes of the printing fluid on an exposed surface of the bottom layer, such that the spherical domes form a braille text.

16. The sign manufacturing system of claim 15, further comprising a control unit, which is configured to control sliding motions of the first component in the longitudinal direction and of the assembly body in the lateral direction.

17. A method for printing characters for using a sign manufacturing system, the method comprising:
providing a sign manufacturing including:
a) a printing base;
b) a printing panel, which is removably positioned on a top surface of the printing base, wherein the printing panel comprises: a top layer, a pressure sensitive adhesive, and a transparent bottom layer, wherein the pressure sensitive adhesive is positioned between the top layer and the transparent bottom layer;
c) a first component slidably connected to the printing base, the component being configured to slide along a longitudinal direction relative to the printing base; and
d) a second component, including: an assembly body slidably connected to the first component, such that the assembly body is configured to slide along a lateral direction relative to the printing base; and a laser connected to the assembly body, wherein a laser beam emitted from the laser is configured to point downward and impact the printing panel; and
e) a control unit;
controlling the sliding motions of the first component in the longitudinal direction and of the assembly body in the lateral direction; and
emitting a laser beam from the laser connected to the assembly body, thereby cutting characters out of the top layer.

18. The method of claim 17, wherein the sign manufacturing system further comprises a liquid ejection unit, which is connected to the assembly body, such that an ejection point of the liquid ejection unit is configured to point downward, and
wherein the method further comprises injecting liquid drops of a printing fluid on the printing panel via the liquid ejection unit.

19. The method of claim 18, wherein the liquid drops are spherical domes of the printing fluid on an exposed surface of the transparent bottom layer, such that the spherical domes form a braille text.

20. The method of claim 17, wherein the sign manufacturing system further comprises a curing laser, and wherein the method further comprises emitting a curing laser beam, which is pointed at the spherical domes thereby curing and hardening the spherical domes.

* * * * *